United States Patent [19]

Okazaki

[11] Patent Number: 5,497,387
[45] Date of Patent: Mar. 5, 1996

[54] SOLID-STATE LASER USING WEDGE-SHAPED OPTICAL MEMBER, AND METHOD FOR MANUFACTURING THE SAME

[75] Inventor: Yoji Okazaki, Kanagawa, Japan

[73] Assignee: Fuji Photo Film Co., Ltd., Kanagawa, Japan

[21] Appl. No.: 365,363

[22] Filed: Dec. 28, 1994

[30] Foreign Application Priority Data

Dec. 28, 1993 [JP] Japan ................... 5-335471

[51] Int. Cl.$^6$ ........................................ H01S 3/10
[52] U.S. Cl. ................... 372/21; 372/70; 372/34; 372/92; 372/105; 372/106
[58] Field of Search ..................... 372/9, 21, 22, 372/33, 34, 43, 50, 69, 70, 71, 72, 92, 98, 105, 106, 108

[56] References Cited

U.S. PATENT DOCUMENTS

| | | | |
|---|---|---|---|
| 4,181,899 | 1/1980 | Liu | 372/21 X |
| 4,809,291 | 2/1989 | Byer et al. | 372/75 |
| 4,914,658 | 4/1990 | Stankov et al. | 372/18 |
| 5,124,999 | 6/1992 | Okazaki et al. | 372/69 |
| 5,128,956 | 7/1992 | Aoki et al. | 372/43 X |
| 5,164,947 | 11/1992 | Lukas et al. | 372/22 |
| 5,175,741 | 12/1992 | Okazaki | 372/75 |
| 5,237,578 | 8/1993 | Amano | 372/22 |
| 5,263,038 | 11/1993 | Lukas et al. | 372/22 |
| 5,410,560 | 4/1995 | Taira | 372/21 |
| 5,432,807 | 7/1995 | Okazaki et al. | 372/22 |

Primary Examiner—Brian Healy
Attorney, Agent, or Firm—Sughrue, Mion, Zinn, Macpeak & Seas

[57] ABSTRACT

A solid-state laser is made up of a solid-state laser crystal, a pump source for pumping the laser crystal, a resonator, an etalon disposed in the resonator for selecting an oscillation wavelength, and a nonlinear optical crystal disposed in the resonator for converting the wavelength of the solid-state laser beam. A wedge-shaped optical member, with two light-transmission end faces being not parallel to each other, is disposed in the resonator. A resonator mode is set to a mode, where the maximum output of a solid-state laser beam is obtained with respect to a resonator temperature in the vicinity of a temperature at which the maximum efficiency of wavelength conversion of the nonlinear optical crystal is obtained, by fixing the wedge-shaped optical member at an optimum position. A wedge-shaped nonlinear optical member may be used both as the nonlinear optical crystal and the wedge-shaped optical member, or a wedge-shaped etalon may be used both as the etalon and the wedge-shaped optical member. Alternately, the solid-state laser further includes a wedge-shaped birefringent polarization control element, with two end faces being not parallel to each other, for controlling the direction of linear polarization of a solid-state laser, and this wedge-shaped birefringent polarization control element may be used as the wedge-shaped optical member.

8 Claims, 3 Drawing Sheets

SOLID-STATE LASER USING WEDGE-SHAPED OPTICAL MEMBER, AND METHOD FOR MANUFACTURING THE SAME

BACKGROUND OF THE INVENTION

1. Field of the Invention

The present invention relates to a solid-state laser having a nonlinear optical crystal which is incorporated into a resonator for converting the wavelength of a laser beam, and more particularly relates to a solid-state laser designed in such a way that a wavelength-converted wave having a high output is obtained by adjusting the length of the resonator to an optimum length. Moreover, the present invention relates to a method for manufacturing the previously mentioned solid-state laser.

2. Description of the Prior Art

As disclosed in, for example, U.S. Pat. No. 4,656,635, a solid-state laser is publicly known in which a solid-state laser, doped with rare earth elements such as Neodymium, is pumped with a semiconductor laser or the like.

In this type of solid-state laser, in order to obtain a laser beam having a shorter wavelength, it is widely practiced that the wavelength of a solid-state laser is converted to a second harmonic wave by disposing crystal made of a nonlinear optical material in a resonator of the laser. Further, in the field of such a solid-state laser, various proposals have been put forward in which an etalon for selecting an oscillation wavelength is disposed in a resonator to select a single longitudinal mode.

When the temperature of the resonator disposed in such a solid-state laser is changed, optical members of the resonator and mechanical members, such as a copper block for fixing the optical members, undergo thermal expansion. This causes the refractive indices of the optical members to vary, which in turn results in variations in the length of the resonator. If the temperature of the resonator is changed in the manner as mentioned above when the etalon is disposed within the resonator, a resonator mode that depends on the length of the resonator might, or might not, be matched with an etalon mode. This causes an output of the solid-state laser to be varied.

A curve "a" shown in FIG. 1 represents the outline of the relationship between the temperature T of a resonator and an output $P^{\omega}$ of a solid-state laser in the above mentioned situation. As can be seen from the drawing, the maximum value of the output $P^{\omega}$ is obtained when the resonator temperature $T=T_1$, at which a resonator mode is matched with an etalon mode. The output gradually drops as the resonator temperature T shifts away from $T_1$, and the output becomes minimum when the temperature $T=T_2$, at which the resonator mode is switched to another mode.

When the wavelength of a solid-state laser is converted by the use of a nonlinear optical crystal disposed in the resonator, an output $p^{2\omega}$ of a wavelength-converted wave (for example, a second harmonic wave) varies in accordance with the temperatures of the crystal, i.e. the temperature T of the resonator, as represented by a curve "b" shown in FIG. 1. Specifically, the efficiency of conversion of a wavelength becomes maximum when the resonator temperature $T=T_3$. However, if the resonator temperature $T_2$, at which the resonator mode is switched to another mode, is matched with or close to the resonator temperature $T_3$, the output $p^{2\omega}$ of the second harmonic wave will not be increased so much even when a high efficiency of wavelength conversion is obtained by setting the resonator temperature T to $T_3$, because an output of the solid-state laser, which serves as a fundamental wave, is itself small.

Further, in this case, if the resonator temperature T is set to $T_3$, longitudinal modes at low temperatures of the resonator and longitudinal modes at high temperatures of the resonator simultaneously exist, and this induces mode competition. For this reason, noise develops in a wavelength-converted wave.

To solve this problem, a proposal has conventionally been put forward in which resonator mirrors are moved in the direction of the optical axis using piezoelectric elements so as to vary a resonator mode, so that the relationship between the resonator temperature T and the output $P^{\omega}$ of the solid-state laser is changed like a curve "c" shown in FIG. 1. In other words, with such a construction, it is possible to sufficiently increase the output $p^{2\omega}$ of the second harmonic wave by making the resonator temperature, at which the output $P^{\omega}$ of the solid-state laser becomes maximum, coincident with or close to the resonator temperature, at which the maximum wavelength conversion efficiency is obtained.

The previously mentioned construction, in which the resonator mirrors are moved in the direction of the optical axis using piezoelectric elements in the manner as mentioned above, provides poor long-term reliability. Therefore, the long-term reliability of the solid-state laser is impaired.

SUMMARY OF THE INVENTION

The present invention is made in view of the above observations, and the primary object of this invention is to provide a solid-state laser that permits a wavelength-converted wave having a high output to be obtained and maintains a superior long-term reliability.

The second object of the present invention is to provide a method for manufacturing such a solid-state laser.

To achieve these objects, according to one aspect of this invention, there is provided a solid-state laser crystal;

a pump source for pumping the solid-state laser crystal;

a resonator;

an etalon disposed in the resonator for selecting an oscillation wavelength;

a nonlinear optical crystal disposed within the resonator for converting the wavelength of a solid-state laser beam;

a wedge-shaped optical member with both light-transmission end faces thereof not parallel to each other disposed within the resonator, wherein the wedge-shaped optical member is fixed at the position where a resonator mode is set for obtaining the maximum output of the solid-state laser beam with respect to a resonator temperature in the vicinity of a temperature at which the maximum efficiency of wavelength conversion of the nonlinear optical crystal is obtained.

According to another aspect of this invention, there is provided a method for manufacturing a solid-state laser, the solid-state laser being provided with a solid-state laser crystal, a pump source for pumping the solid-state laser crystal, a resonator, an etalon disposed in the resonator for selecting an oscillation wavelength, and a nonlinear optical crystal disposed in the resonator for converting the wavelength of a solid-state laser, the method comprising the steps of:

arranging, in the resonator, a wedge-shaped optical member with both light-transmission end faces thereof not parallel to each other;

changing a resonator mode by moving the optical member in the direction in which the light transmission length of the solid-state laser beam is varied; and fixing the optical member, in the resonator, at the location where the resonator mode is set in such a way that the maximum output of the solid-state laser beam is obtained with respect to the temperature of the resonator in the vicinity of the temperature at which the maximum efficiency of wavelength conversion of a nonlinear optical crystal is obtained.

As a matter of course, a specialized optical member may be provided as the optical member for changing the resonator mode. Alternately, a wedge-shaped nonlinear optical crystal or a wedge-shaped etalon may be used as the previously mentioned nonlinear optical crystal or the etalon, and these can be also used as the optical member. If a polarization control element for controlling the direction of polarization of the solid-state laser is disposed in the resonator, this polarization control element will be shaped like a wedge, and the wedge-shaped control element can be also used as the optical element.

If the wedge-shaped optical member as mentioned above is moved in the direction in which the length of light transmission of the solid-state laser beam is varied, (for example, in the direction substantially parallel to either of the two light transmission planes), the length of the optical path in the resonator will be changed even though the mechanical length of the resonator will not be changed. This causes the resonator mode to be changed. In this way, in the same manner as when the resonator mode is changed by moving the resonator mirror in the prior art, it is possible to set the resonator mode (designated by the curve "c" shown in FIG. 1) at which the maximum output of the solid-state laser is obtained with respect to the temperature of the resonator in the vicinity of the temperature $T_3$ where the maximum efficiency of wavelength conversion of the nonlinear optical crystal is obtained.

If the solid-state laser having the above construction is used while the temperature thereof is controlled in such a way that the resonator temperature becomes close to $T_3$, a wavelength-converted wave having a considerably high output will be obtained because the output of the solid-state laser which serves as the fundamental wave is high as well as the efficiency of wavelength conversion being high.

If the solid-state laser according to this invention is used while the temperature thereof is controlled in the manner as previously mentioned, the resonator temperature will be shifted out of the temperature range ($T_2'$ and $T_2''$ in FIG. 1) where the resonator mode is switched. Hence, noise developing in the wavelength-converted wave as a result of mode competition will be prevented.

In accordance with the solid-state laser having the construction according to the present invention, the optical member which causes the resonator mode to be changed is fixed at the optimum location, and the solid-state laser is not provided with a movable portion consisting of, for instance, a piezo element. This renders the long-term reliability of the solid-state laser improved.

DESCRIPTION OF THE PREFERRED EMBODIMENTS

With reference to the accompanying drawings, preferred embodiments of the present invention will be described in detail hereinbelow.

First Embodiment

Figure 1:
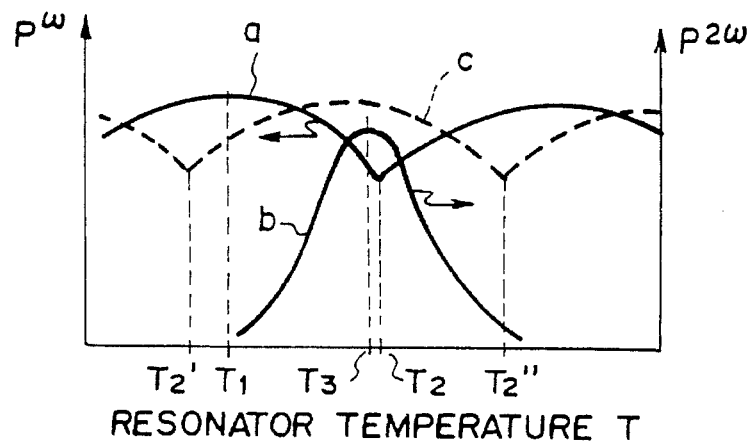
FIG. 1 is a graph showing the outline of the relationship between the temperature of a resonator in an existing solid-state laser, an output of a solid-state laser and an output of a second harmonic wave.
Figure 2:
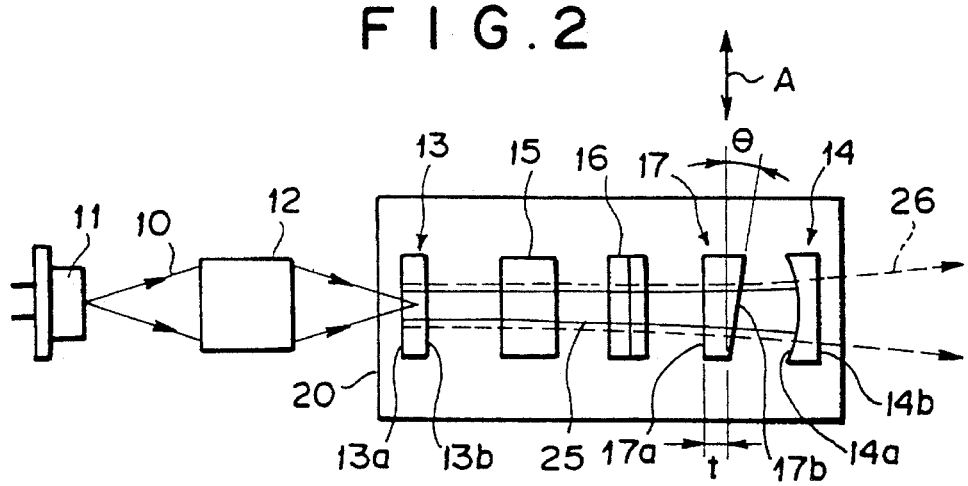
FIG. 2 is a plan view showing a first embodiment of a laser-diode-pumped solid-state laser according to the present invention.
Figure 3:
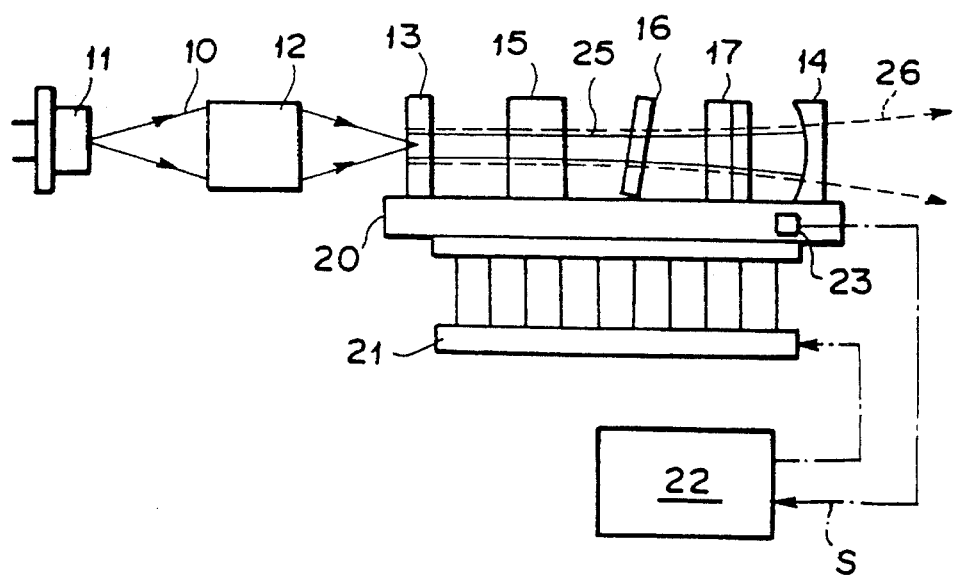
FIG. 3 is a side view showing the laser-diode-pumped solid-state laser of the first embodiment.

FIGS. 2 and 3 respectively show plane and side views of the laser-diode-pumped solid-state laser according to the first embodiment.

The laser-diode-pumped solid-state laser is made up of a semiconductor laser (a phased-coupled array laser) which emanates a laser beam 10 as a pump beam; a condenser lens 12 for converging the laser beam 10 which is a divergent beam; a YAG crystal 13 (hereinafter referred to as an Nd:YAG crystal) doped with Neodymium (Nd); a resonator mirror 14 disposed (at the right side in the drawing) in front of this YAG crystal 13; a KNbO$_3$ crystal (hereinafter referred to as a KN crystal) interposed between the resonator mirror 14 and the Nd:YAG crystal 13; an etalon 16 interposed between the KN crystal 15 and the resonator mirror 14; and a wedge-shaped optical member 17 interposed between the etalon 16 and the resonator mirror 14.

Of the components mentioned above, the elements 13–17 other than the semiconductor laser 11 and the condenser lens 12 are mounted on a common copper block 20, and they are maintained at a constant temperature by means of a Peltier element 21 and a temperature controller circuit 22. The temperature control is effected by inputting a temperature detected signal S output from a thermistor 23 mounted on the copper block 22 to the temperature controller circuit 22, and by controlling the drive of the Peltier element 21 on the basis of the temperature detected signal S by means of the temperature controller circuit 22.

A semiconductor laser which emanates the laser beam 10 having a wavelength of 809 nm is used as the semiconductor laser 11. As a result of the excitation of neodymium atoms by means of the incident laser beam 10, the Nd:YAG crystal 13 emits a solid-state laser beam 25 having a wavelength of 946.2 nm. This laser beam 25 enters the KN crystal 15, and it is then converted into a second harmonic wave 26 having half the wavelength of the laser beam, i.e. a wavelength of 473.1 nm, by means of the KN crystal 15 which is a nonlinear optical material.

The reflectivities or transmittances of end faces 13a and 13b of the Nd:YAG crystal 13 and a mirror face 14a and a light exit end face 14b of the resonator mirror 14 is adjusted as shown in the following table by appropriately coating the end faces, the mirror face and the light exit end face. In the table, R indicates a reflectivity, and T indicates transmittance. Moreover, values are represented by percentages.

|         | 13a      | 13b      | 14a      | 14b      |
|---------|----------|----------|----------|----------|
| 809 nm  | T ≧ 85   | T ≧ 2    | —        | —        |
| 946.2 nm| R ≧ 99.9 | R ≧ 0.1  | R ≧ 99.9 | R ≧ 0.2  |
| 473.1 nm| R ≧ 99.5 | R ≧ 0.2  | T ≧ 93   | R ≧ 0.3  |

Since the end faces, the mirror face and the light exit end surface are covered with the coatings listed in the above table, the laser beam 25 having a wavelength of 946.2 nm oscillates between the end face 13a of the Nd:YAG crystal 13 and the mirror surface 14a of the resonator mirror 14, so that the second harmonic wave 26 is forwardly emanated from the resonator mirror 14. In other words, in this embodiment, the resonator of the solid-state laser is made up of the Nd:YAG crystal 13 and the resonator mirror 14. Longitudinal modes of the laser beam 25 are selected by the etalon 16, and the selection of a single longitudinal mode is realized.

The wedge-shaped optical member 17 disposed within the resonator will now be explained in detail.

This wedge-shaped optical member 17 consists of, for example, silica glass having a refractive index of n=1.45. As shown in FIG. 2, the two end faces 17a and 17b of the optical member 17, which serve as light transmission planes, are formed so as not to be parallel to each other. The thickness of the thinnest portion of the end face is t=0.5 mm, and an angle between the end faces 17a and 17b is θ=2'. This wedge-shaped optical member 17 is arranged in such a way that the end face 17a is oriented in the direction orthogonal to the axis of the resonator.

When the wedge-shaped optical member 17 is moved in the direction parallel to the end face 17a (in the direction of an arrow A shown in FIG. 2), the length of light transmission of the laser beam 25 within this optical member varies at a rate of 0.1 μm for every 200 μm of shift of the optical member. In this way, the length of the optical path of the resonator is changed by varying the length of the light transmission of the laser beam 25 within the wedge-shaped optical member 17, and hence the resonator mode is also changed. Accordingly, it is possible to change the relationship between a resonator temperature T and an output $P^\omega$ of the solid-state laser, which depends on the relationship between the resonator mode and an etalon mode, by means of the movement of the wedge-shaped optical member 17.

Figure 4:
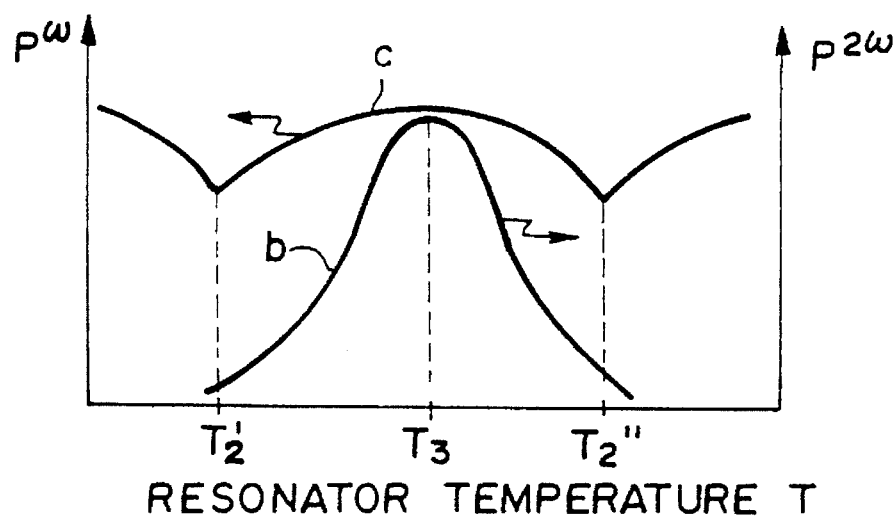
FIG. 4 is a graph showing the outline of the relationship between the temperature of a resonator used in the solid-state laser of the first embodiment, an output of a solid-state laser beam, and an output of a second harmonic wave.

As previously mentioned, an output $p^{2\omega}$ of the second harmonic wave 26 varies in accordance with the temperature of the crystal, i.e. the resonator temperature T, as indicated by a curve "b" shown in FIG. 4. The output becomes maximum when T=$T_3$. When the laser-diode-pumped solid-state laser is assembled, the resonator mode is changed by appropriately shifting the wedge-shaped optical member 17 in the aforementioned direction in such a way that the output $P^\omega$ of the solid-state laser 25 becomes maximum when the resonator temperature T becomes $T_3$, that is, the relationship between the resonator temperature T and the output $P^\omega$ becomes similar to a curve "c" shown in FIG. 4. When such a relationship is obtained, the wedge-shaped optical member 17 is fixed to the copper block 20 using adhesive or the like.

The laser-diode-pumped solid-state laser thus manufactured is used while the temperature thereof is controlled in such a way that the resonator temperature T becomes close to $T_3$. As a result of this, the second harmonic wave 26 having a considerably high output is obtained, because the output of the solid-state laser beam 25, which acts a fundamental wave, is high as well as the efficiency of wavelength conversion being high.

Further, if this laser-diode-pumped solid-state laser is used while the temperature thereof is used in the manner as previously mentioned, the resonator temperature will be shifted out of the temperature range ($T_2'$ and $T_2''$ shown in FIG. 4) where the resonator mode is switched. Noise developing in the second harmonic wave 26 as a result of mode competition will be prevented. In this first embodiment, $T_3$=25° C., $T_2'$=23° C., and $T_2''$=27° C.

Figure 5:
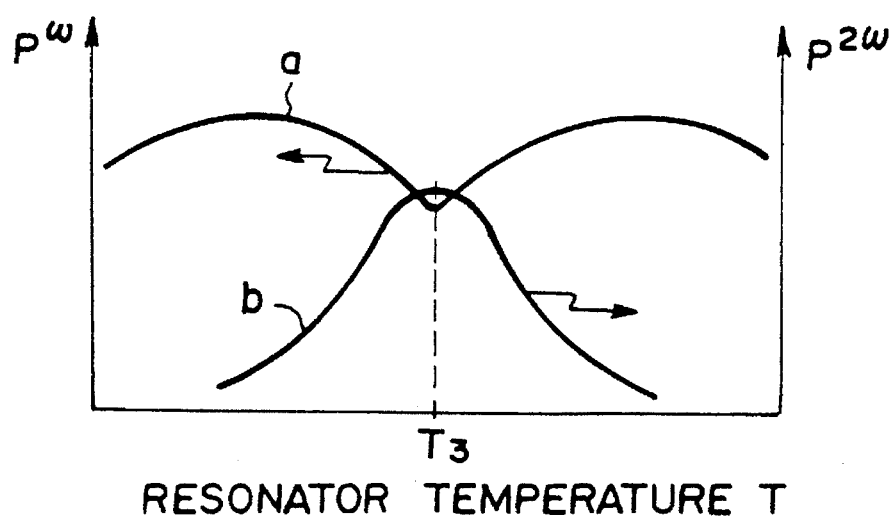
FIG. 5 is a graph showing the outline of the relationship between the temperature of a resonator used in a solid-state laser which is a comparative example with respect to the present invention, an output of a solid-state laser beam, and an output of a second harmonic wave.

In the comparative example in which the resonator mode is set in such a way that the relationship between the resonator temperature T and the output $P^\omega$ of the solid-state laser 25 becomes similar to a curve "a" shown in FIG. 5, the output of the second harmonic wave 26 was kept at 1 mW when the output of the semiconductor laser 11 was 300 mW, and the occurrence of noise as a result of mode competition was also ascertained.

To change the relationship between the resonator temperature T and the output $P^\omega$ of the solid-state laser 25 from the curve "a" shown in FIG. 5 to the curve "c" shown in FIG. 4, all that needs to be is to shift the wedge-shaped optical member 17, for example, 0.5 mm (=500 μm) in the previously mentioned direction. At this time, the length of the optical path of the resonator varies 1.45×0.1×(500/200)= 0.36 μm.

Figure 6:
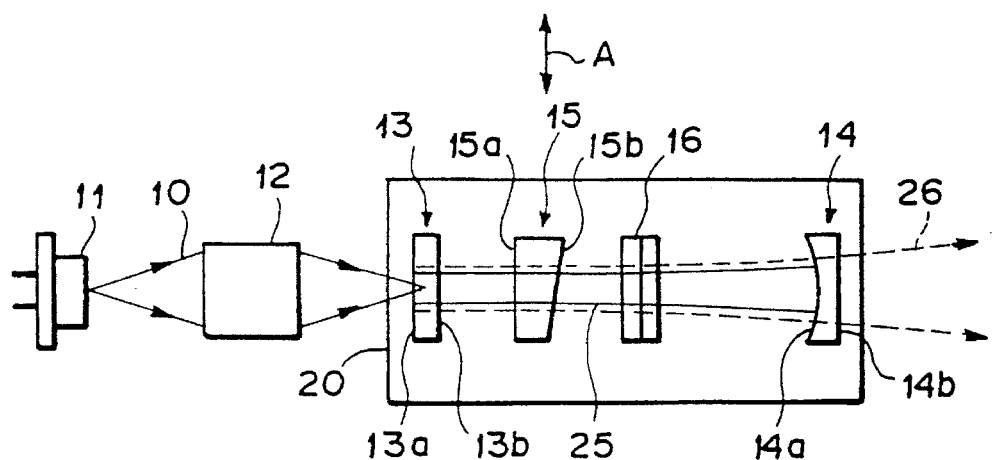
FIG. 6 is a plan view showing a second embodiment of a laser-diode-pumped solid-state laser according to the present invention.
Figure 7:
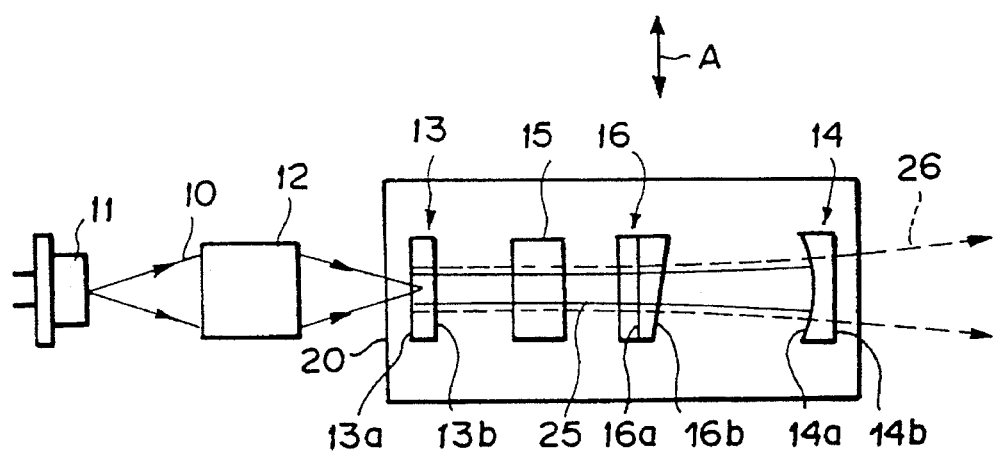
FIG. 7 is a plan view showing a third embodiment of a laser-diode-pumped solid-state laser according to the present invention.
Figure 8:
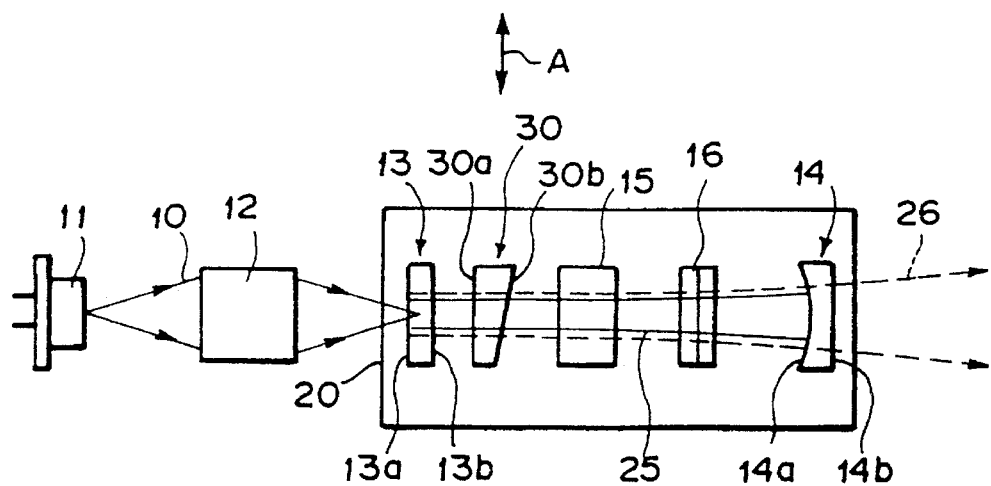
FIG. 8 is a plan view showing a fourth embodiment of a laser-diode-pumped solid-state laser according to the present invention.

In the first embodiment set forth above, the specialized wedge-shaped optical member 17 is provided in order to change the resonator mode. It is also possible to create another optical member in the form of a wedge which is disposed in the resonator for another purpose, and to use this optical member in order to change the resonator mode. With reference to FIGS. 6 through 8, other embodiments of the present invention in which the optical member thus formed is used will be explained. In these drawings, the same reference numerals are provided to designate corresponding features shown in FIGS. 2 and 3, and hence the explanation thereof will be omitted here for brevity.

Second Embodiment

In a second embodiment of the laser-diode-pumped solid-state laser shown in FIG. 6, the KN crystal 15 disposed in the resonator for converting wavelength is formed in the shape of a wedge in which the two light-transmission end faces 15a and 15b thereof are not parallel to each other. Effects similar to those of the first embodiment will be obtained by moving the KN crystal 15, for example, in the direction of the arrow A, and by fixing it at an optimum position.

Third Embodiment

In a third embodiment of the laser-diode-pumped solid-state laser shown in FIG. 7, the etalon 16 disposed in the resonator for selecting a longitudinal mode is formed in the shape of a wedge in which the two light-transmission end faces 16a and 16b thereof are not parallel to each other. Effects similar to those of the first embodiment will be obtained by moving this etalon 16, for example, in the direction of the arrow A, and by fixing it at an optimum position.

Fourth Embodiment

In a fourth embodiment of the laser-diode-pumped solid-state laser shown in FIG. 8, a birefringent polarization control element 30 is disposed in the resonator to control the direction of linear polarization of the solid-state laser 25. This birefringent polarization control element 30 is formed in the shape of a wedge in which the two light-transmission end faces 30a and 30b thereof are not parallel to each other. Effects similar to those of the first embodiment will be obtained by moving the polarization control element 30, for example, in the direction of the arrow A, and by fixing it at an optimum position.

Although the preferred embodiments of the present invention have been described, it goes without saying that the materials of the nonlinear optical crystal, the solid-state laser crystal and the wedge-shaped optical member are not limited to those mentioned in the above.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to those who are versed in the art.

What is claimed is:

1. A solid-state laser comprising:
   a solid-state laser crystal;
   a pump source for pumping the solid-state laser crystal;
   a resonator;
   an etalon disposed in the resonator for selecting an oscillation wavelength;
   a nonlinear optical crystal disposed within the resonator for converting the wavelength of a solid-state laser beam;
   a wedge-shaped optical member having two light-transmission end faces, which are not parallel to each other, disposed in the resonator, wherein
   the wedge-shaped optical member is fixed at the position where a resonator mode is set for obtaining the maximum output of the solid-state laser beam with respect to a resonator temperature in the vicinity of a temperature at which the maximum efficiency of wavelength conversion of the nonlinear optical crystal is obtained.

2. The solid-state laser as defined in claim 1, wherein the nonlinear optical crystal is formed in the shape of a wedge, and this wedge-shaped nonlinear optical crystal is used both as the nonlinear optical crystal and the wedge-shaped optical member.

3. The solid-state laser as defined in claim 1, wherein the etalon is formed in the shape of a wedge, and this wedge-shaped etalon is used both as the etalon and the wedge-shaped optical member.

4. The solid-state laser as defined in claim 1, further comprising a wedge-shaped birefringent polarization control element, with both end faces thereof being not parallel to each other, for controlling the direction of linear polarization of a solid-state laser, and this wedge-shaped birefringent polarization control element is the wedge-shaped optical member.

5. A method for manufacturing a solid-state laser, in which the solid-state laser includes a solid-state laser crystal, a pump source for pumping the solid-state laser crystal, a resonator, an etalon disposed in the resonator for selecting an oscillation wavelength, and a nonlinear optical crystal disposed in the resonator for converting the wavelength of a solid-state laser, the method comprising the steps of:
   arranging, in the resonator, a wedge-shaped optical member having two light-transmission end faces which are not parallel to each other;
   changing a resonator mode by moving the optical member in the direction in which the length of light transmission of the solid-state laser beam varies; and
   fixing the optical member, in the resonator, at the location where the resonator mode is set in such a way that the maximum output of the solid-state laser beam is obtained with respect to the temperature of the resonator in the vicinity of the temperature at which the maximum efficiency of wavelength conversion of the nonlinear optical crystal is obtained.

6. The method for manufacturing a solid-state laser as defined in claim 5, wherein the nonlinear optical crystal is formed in the shape of a wedge, and this wedge-shaped nonlinear optical crystal is used both as the nonlinear optical crystal and the wedge-shaped optical member.

7. The method for manufacturing a solid-state laser as defined in claim 5, wherein the etalon is formed in the shape of a wedge, and this wedge-shaped etalon is used both as the etalon and the wedge-shaped optical member.

8. The method for manufacturing solid-state laser as defined in claim 5, wherein the solid-state laser further comprises a wedge-shaped birefringent polarization control element, with both ends thereof being not parallel to each other, for controlling the direction of linear polarization of a solid-state laser, and this wedge-shaped birefringent polarization control element is the wedge-shaped optical member.

* * * * *